(12) United States Patent  
Rothschild

(10) Patent No.: US 8,417,377 B2
(45) Date of Patent: Apr. 9, 2013

(54) SYSTEM AND METHOD FOR CREATING A PERSONALIZED CONSUMER PRODUCT

(75) Inventor: Leigh M. Rothschild, Sunny Isles Beach, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 283 days.

(21) Appl. No.: 12/854,451

(22) Filed: Aug. 11, 2010

(65) Prior Publication Data

US 2011/0022225 A1 Jan. 27, 2011

Related U.S. Application Data

(63) Continuation of application No. 11/471,323, filed on Jun. 20, 2006, now Pat. No. 7,899,713.

(51) Int. Cl.
*G06F 17/00* (2006.01)
(52) U.S. Cl. .......................... 700/233; 700/237; 700/239
(58) Field of Classification Search ................... 700/233, 700/239, 237
See application file for complete search history.

(56) References Cited

U.S. PATENT DOCUMENTS

| | | | |
|---|---|---|---|
| 5,989,445 A | 11/1999 | Wise et al. | |
| 6,206,022 B1 * | 3/2001 | Tsai et al. | 137/15.18 |
| 6,253,956 B1 * | 7/2001 | Khan et al. | 221/211 |
| 6,592,098 B2 | 7/2003 | Kao et al. | |
| 6,782,307 B2 * | 8/2004 | Wilmott et al. | 700/233 |
| 6,856,861 B2 * | 2/2005 | Dirksing et al. | 700/239 |
| 7,099,740 B2 * | 8/2006 | Bartholomew et al. | 700/233 |
| 7,295,889 B2 * | 11/2007 | Lahteenmaki | 700/233 |
| 7,299,109 B2 * | 11/2007 | Juds et al. | 700/237 |

OTHER PUBLICATIONS

Collier et al., "Development of a Rapid-Response Flow-Control System Using MEMS Microvalve Arrays",Journal of Microelectromechanical Systems,vol. 13,No. 6, Dec. 2004, pp. 912-922.

* cited by examiner

*Primary Examiner* — Timothy Waggoner
(74) *Attorney, Agent, or Firm* — Gerald E. Hespos; Michael J. Porco; Matthew T. Hespos

(57) ABSTRACT

A system and method for creating a personalized consumer product are provided. The system and method of the present disclosure enables a user, e.g., a consumer, to customize products containing solids and/or fluids by allowing a server communicating over the global computer network, e.g., the Internet, to provide product preferences of a user to a product or a mixing device, e.g., a product or beverage dispenser. The method for creating a product according to a user's preferences over a network includes the steps identifying a product to a server over the network; identifying a user to the server over the network; retrieving the user's product preferences from a database at the server based on the product's identity and user's identity; transmitting the user's product preferences to the product over the network; and mixing at least one element contained within the product based on the user's product preferences.

26 Claims, 5 Drawing Sheets

SYSTEM AND METHOD FOR CREATING A PERSONALIZED CONSUMER PRODUCT

PRIORITY

The present application is a continuation application of U.S. patent application Ser. No. 11/471,323, filed Jun. 20, 2006, now U.S. Pat. No. 7,899,713 the contents of which are hereby incorporated by reference in their entirety.

BACKGROUND

1. Field

The present disclosure relates generally to data processing systems and consumer products, and more particularly, to a system and method for creating a personalized consumer product.

2. Description of the Related Art

The sale of consumer products such as beverage products, health products and perfumes to name a few is a multibillion-dollar worldwide business. Increasingly, the consumer is given a wider choice of different types of the same product. For instance, in soda beverages, the consumer can now purchase not only a cola beverage (e.g., a regular flavor), but vanilla cola, diet cola, lemon cola, and cherry cola. Similarly, and also in the beverage industry, with vitamin water, the consumer can purchase the water beverage in lemon, berry, kiwi, strawberry, melon, peach, black cherry and grape, e.g., Propel™ brand water.

The trend of allowing the user to choose from various types of differentiated products of the same brand also exists in shampoos and other health products. For instance, with Head and Shoulders™ brand dandruff shampoo, the user can now choose from dry scalp, classic clean, sensitive care, ocean lift, extra volume, refresh, citrus breeze, smooth and silky and intensive treatment. It is apparent from the above that the user wants to have a wide and yet specific choice for the products that they use. However, even with nine dandruff shampoo choices, the consumer is not getting a product that is specifically tailored for them. In the previous example, even with nine different dandruff products, the shampoo product will still not cover the specific needs of the millions of consumers who use or want to use this product.

Therefore, a need exists for techniques to allow consumers to personalize products for their specific needs. A further need exists for a system and method to enable a user to customize a consumable product wherein the user's product preferences may be stored and retrieved at a later time when the user purchases the product.

SUMMARY

A system and method to enable users to control mix parameters of a product from the global computer network to obtain a personalized consumer product are provided. The system and method of the present disclosure will enable a user to customize products containing solids and fluids by allowing a server on the global computer network, e.g., the Internet, to instruct the hardware mixing the solids and fluids of the user's preferences for the final mix.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for creating a personalized consumer product are provided. The system and method of the present disclosure enables a user, e.g., a consumer, to customize products containing solids and fluids by allowing a server communicating over the global computer network, e.g., the Internet, to provide product preferences of a user to a product or a mixing device, e.g., a product or beverage dispenser.

For illustrative purposes, a consumer purchases a product, e.g., a name brand shampoo. The user has specific needs for their hair care that they want the shampoo to conform to. By example, this specific user wants the shampoo to have extra moisturizers and a refreshing ocean flavor, but without a tint to color the hair. The user goes to the web site for the product that the user has purchased. The user will type in the web site address, e.g., URL, into their computer, or alternatively, the product communicates the web site information to the user's computer and directs the user to that site. At the product web site, the user fills in information on their consumer product preferences and their specific hair care requirements. The user then places the purchased product near a communication module (e.g., a WiFi™ access point, Bluetooth™ module, infrared port, RFID reader, etc.) coupled to their computer and the server of the web site via the global computer network, e.g., the Internet, tells the product container how to mix the various elements contained in the product container so that the final product mix conforms to what the web site/server has determined would be appropriate for the consumer. The computer server also stores the specific consumer's product preferences, so that future shampoo purchases of the same brand can also be mixed according to the consumer's stored preferences. After the shampoo mix is finalized, the user has a product that has been exactly customized for their individual needs. It is to be appreciated system and method of the present disclosure would apply to the mixing of many consumable products, including toothpaste, shampoos, conditioners, beverages, soaps, etc.

Figure 1:
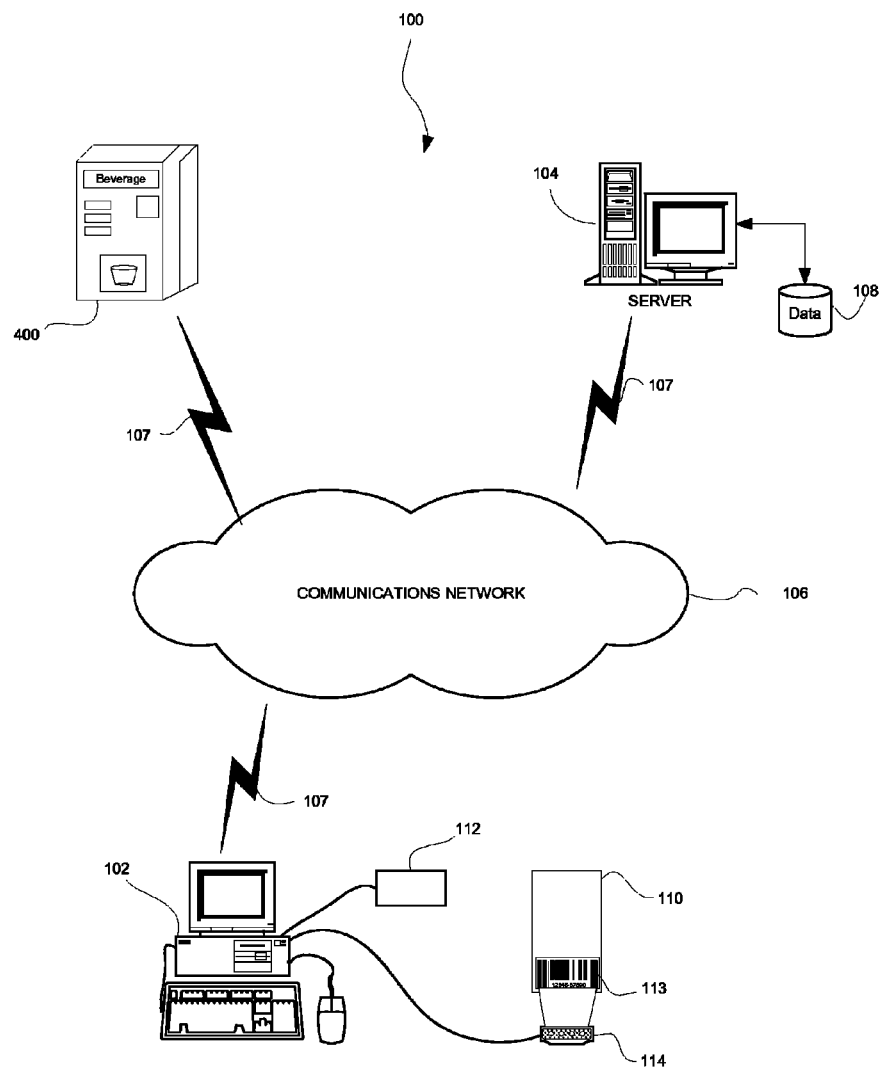
FIG. 1 is a diagram of a system for creating a personalized consumer product in accordance with an embodiment of the present disclosure.

Referring to FIG. 1, a system 100 for creating a personalized consumer product is illustrated. The system 100 includes a terminal 102, e.g., a user computer, for accessing a server 104 over a communications network 106, e.g., the Internet. The terminal 102 and server 104 will communicate using any conventional architecture, for example a client/server architecture where the terminal 102 will execute a client application, e.g., a web browser, to access an application executing on the server 104. The terminal 102 will access the server 104 to enable a user to enter product preferences for a specific product which will be store in database 108 for future use. The server 104 will formulate the proper mix of elements, e.g., ingredients, for the product according to the user's product preferences. The server 104 will transmit the proper formulation to the terminal 102 which will communicate the formulation to the product 110. The terminal 102 will include a communication module 112 for communicating the formulation to the product 110. The communication module 112 may include a hardware or wireless interface to interface with the product 110, as will be described in more detail below.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., terminal 102 or server 104, comprising any suitable architecture such as a personal computer, a workstation or server. Preferably, the machine is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the machine by various interfaces and bus structures, such a parallel port, serial port or universal serial bus (USB). One such peripheral device may include a communications device, e.g., a modem, satellite relay, wireless connection, etc., for enabling communications from the terminal 102 to various servers. Other peripheral devices may include additional storage devices, a printer and a scanner.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The terminal 102 and/or server 104 may operate in a networked environment using logical connections to one or more remote computers. The remote computer may be a personal computer, a server, a router, a network PC, a peer device or other common network node, and typically includes many or all of the elements described above relative to the machine. It is to be appreciated that the network 106 may be a local area network (LAN), wide area network (WAN), the Internet or any known network that couples a plurality of computers to enable various modes of communication via network messages. The terminal 102 may communicate to the server 104 and network 106 via any known communication link 107, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 2:
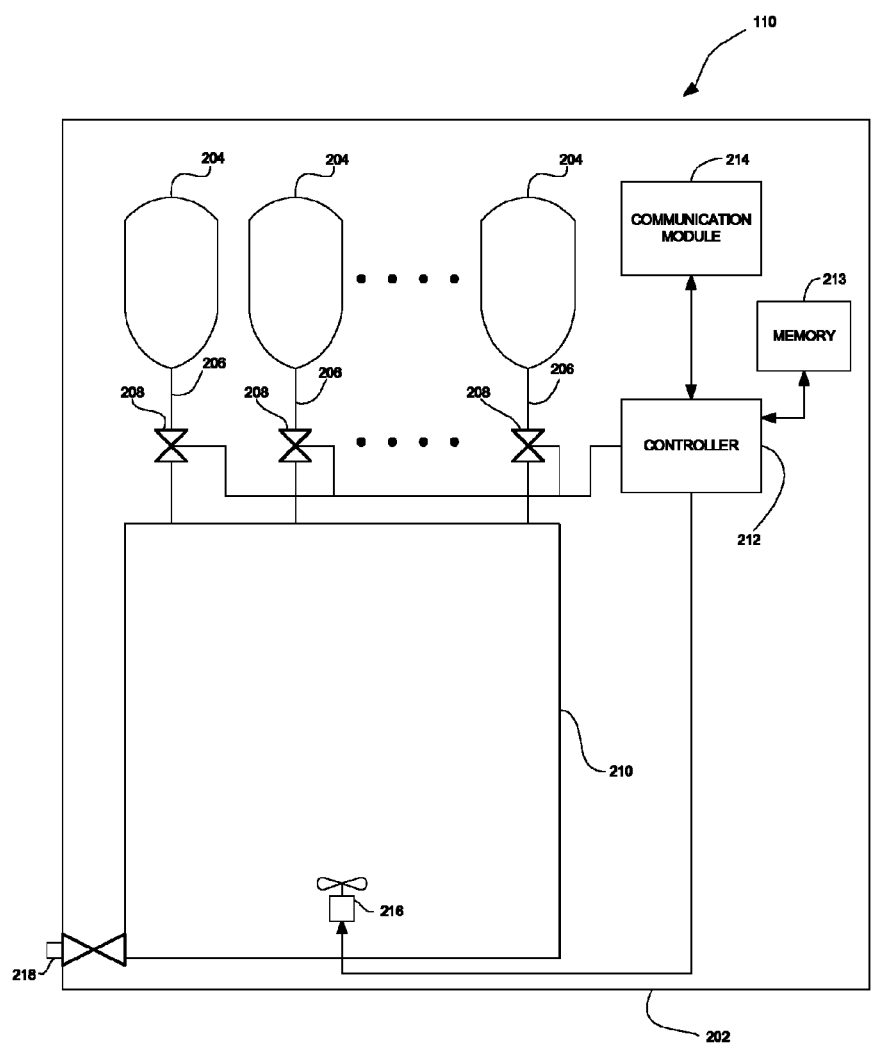
FIG. 2 is an exemplary consumer product in accordance with the present disclosure.
Figure 3:
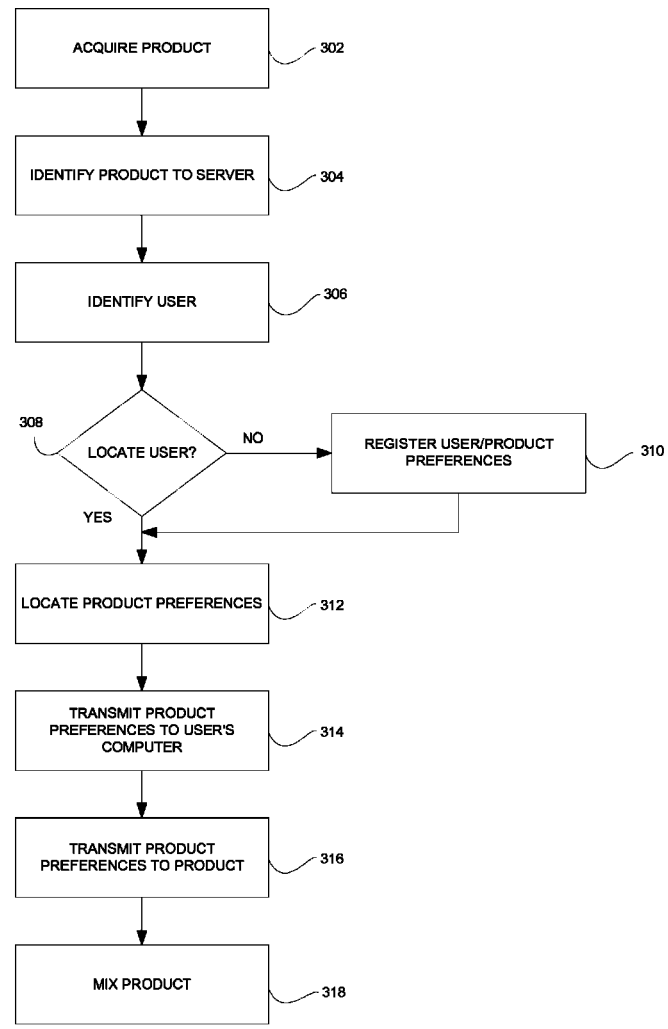
FIG. 3 is a flow chart illustrating a method for creating a consumer product according to a user's specific product preferences.

With reference to FIGS. 1, 2 and 3, a system and method of the present disclosure will now be described, where FIG. 2 illustrates a consumer product in accordance with the present disclosure and FIG. 3 is a flow chart illustrating a method for creating a consumer product according to a user's specific product preferences.

Initially, in step 302, the user purchases and/or acquires the product 110. The product 100 will consist of a case covering or housing 202, and inside the case covering, the product 110 includes one or more sealed compartments 204 that are waterproof and gas proof. These compartments 204 will contain the elements, e.g., fluids and/or solids, to be mixed to produce the final product. Each compartment is connected by a small tube 206 to a chamber 210, e.g., a mixing chamber (MC). Each tube will include a valve 208, e.g., a microvalve, that will control the amount of fluid and/or solid that is dispensed into the mixing chamber 210. The microvalves 208 will be controlled by controller 212, e.g., a microprocessor. Micro Electro Mechanical Systems (MEMS) microvalves are known in the art and exemplary microvalves are disclosed in U.S. Pat. No. 6,592,098 entitled "Microvalve"; U.S. Pat. No. 5,989,445 entitled "Microchannel System for Fluid Delivery"; U.S. Pat. No. 6,206,022 entitled "integrated Flow Controller Module" and "Development of a Rapid-Response Flow-Control System Using MEMS Microvalve Arrays", Journal of Microelectromechanical Systems. Vol., 13, No 6, December 2004, pp. 912-922; the contents of all of which are hereby incorporated by reference in their entireties. In one embodiment, the microvalves and controller are fabricated on a single integrated circuit chip as described in the above reference documents.

A communication module (CM) 214 is provided and coupled to the controller 212. The communication module 214 will communicate to the controller 212 the specific valve settings for each valve based on the user's product preferences. The product 110 will also contain memory 214, e.g., random access memory, read only memory, etc., for storing instructions to be executed by the controller 212. As instructed by the controller 212, the microvalves 208 will release fluids and/or solids from the separate compartments 204 into the central waterproof and gas proof chamber (MC) 210. Optionally, the mixing chamber 210 will contain an actuator or a mixing device 216. The mixing device 216 will be powered by an electric motor or by any other means of power. The actuator or mixing device 216 will be coupled to the controller 212 and will receive instruction from the communication module 214. The communication module 214 will tell the controller 212 when and for how long to activate the actuator or mixing device 216. Upon activation of the actuator 216, the contents of the sealed chamber 210 will be mixed. The mixing chamber 210 will include an exit port 218 for the fluids/solids to be dispensed to the user. This exit port 218 may be a release valve to dispense the fluids/solids, or another type of exit point, e.g., a threaded cylindrical connection and cap, that will allow the user to dispense the contents of the mixing chamber 210.

It is to be appreciated that the final mixed product to be dispensed from the chamber 210 may in one embodiment be a mixture of elements released from the compartments 204. In another embodiment, the chamber 210 may include a base substance before any element is released into the chamber and subsequently elements will be released into the chamber based on the user's product preferences.

After acquiring the product, the user takes the product to a computer/terminal 102 to identify the product (step 304). The identification can be by the user entering a barcode 113 of the product into a web site on the global computer network (GCN) for the product. Alternatively, a scanner 114 is coupled to the terminal 102 for reading the barcode 113 on the product 110 and automatically directing the user's computer to the appropriate web site. In a further embodiment, the identifying step could be done with communications between the product 110 and the computer 102 via communication module 112, e.g., via WiFi™ communications (a, b, d, g, n, etc), Bluetooth™ communications, RFID communications, a cable between the product and a communications port on the applicable computer (e.g., USB, Firewire™, etc.), etc. The communication module (CM) 214 will allow the product 110 to communicate with the computer 102 via the protocols listed above. The communication module 214 of product 110 will identify the product make and model and also direct the computer 102 to the specific web site on the global computer network that applies to the product.

Next, in step 306, the user will transmit their identity to the server 104. In one embodiment, the user's computer will tell the product web site residing on the server the user's identity through a standard Internet cookie stored on the computer 102. The server 104 will identify the cookie and, if the user's identity is known to the server (step 308), the server 104 will use standard lookup database software such as Microsoft™ SQL or Oracle™ Database and standard computer processing power to locate the user's product preferences (PP) (step 312). These preferences will be stored in the server database 108 cross-referenced by the user's identity.

If the server 104 cannot locate the user's identity or the user's product preferences in the database 108 because the user is unknown to the database (step 308), the web site and corresponding server 104 will communicate with the user's computer and transmit a questionnaire to the user for the user to fill out to register the user (step 310). The questionnaire will prompt the user with questions to determine the user's product preferences. Once the questionnaire is completed, the server will use a software algorithm and standard computer processing power to determine the user's product preferences, e.g., the proper mix of elements. Once the user's product preferences are determined, the server will store this information in a standard database software program such as Microsoft™ SQL or Oracle™ Database, cross-referenced to the users identity information. Optionally, the server will issue an identity code, e.g., an alphanumeric code, to the user to facilitate retrieval of the user's product preferences for a subsequent purchase.

Once the user's product preferences are established, the server 104 will communicate this information to the user's terminal 102 (step 314). Once received at the terminal 102, the communication module 112 will transmit this information through the product container or housing 202 using communication protocols including but not limited to Bluetooth™, WiFi™ (a, b, d, g, n, etc), cable, infrared, RFID, voice recognition or any other communications medium now known or practiced in the future (step 316).

The communication module 214 on the product 110 will receive this information and send the information to the controller 212. The controller 212 will then instruct the microvalves 208 in the container 202 as to the specific amount of fluids and/or solids that should be released into the mixing chamber 210 (step 318). The valves will then open to release the fluids and/or solids into the mixing chamber 210. Once released, the fluids and/or solids in the mixing chamber 210 may be mixed by the user manually, by actuator 216 powered by a motor, or by an alternative means. The user may now use the customized product.

In another embodiment of the present disclosure, the user goes to a beverage dispenser, e.g., a soda dispenser or another type of beverage dispenser (coffee, liquor, etc.). The user identifies himself to the beverage dispenser, e.g., by typing in a user code on a touch keypad on the dispenser, via a communications device such as a mobile device having Bluetooth™, WiFi™, RFID, etc. capabilities, via a magnetic card or by voice recognition. The user enters this identity information into the dispenser and the dispenser retrieves the user's product preferences from memory. Alternatively, the dispenser communicates the user's identity information to a server on the global computer network (e.g., the Internet). The server then identifies the user of the dispenser and directs the dispenser to mix the beverage for the user exactly the way the user has predetermined that they like to drink the beverage. In the example of soda, the user can and will determine the amount of carbonation, the amount of sweetness for the beverage, and if any extra flavors, such a lemon or lime, will be added to the beverage. The user is then dispensed the beverage for consumption.

Figure 4:
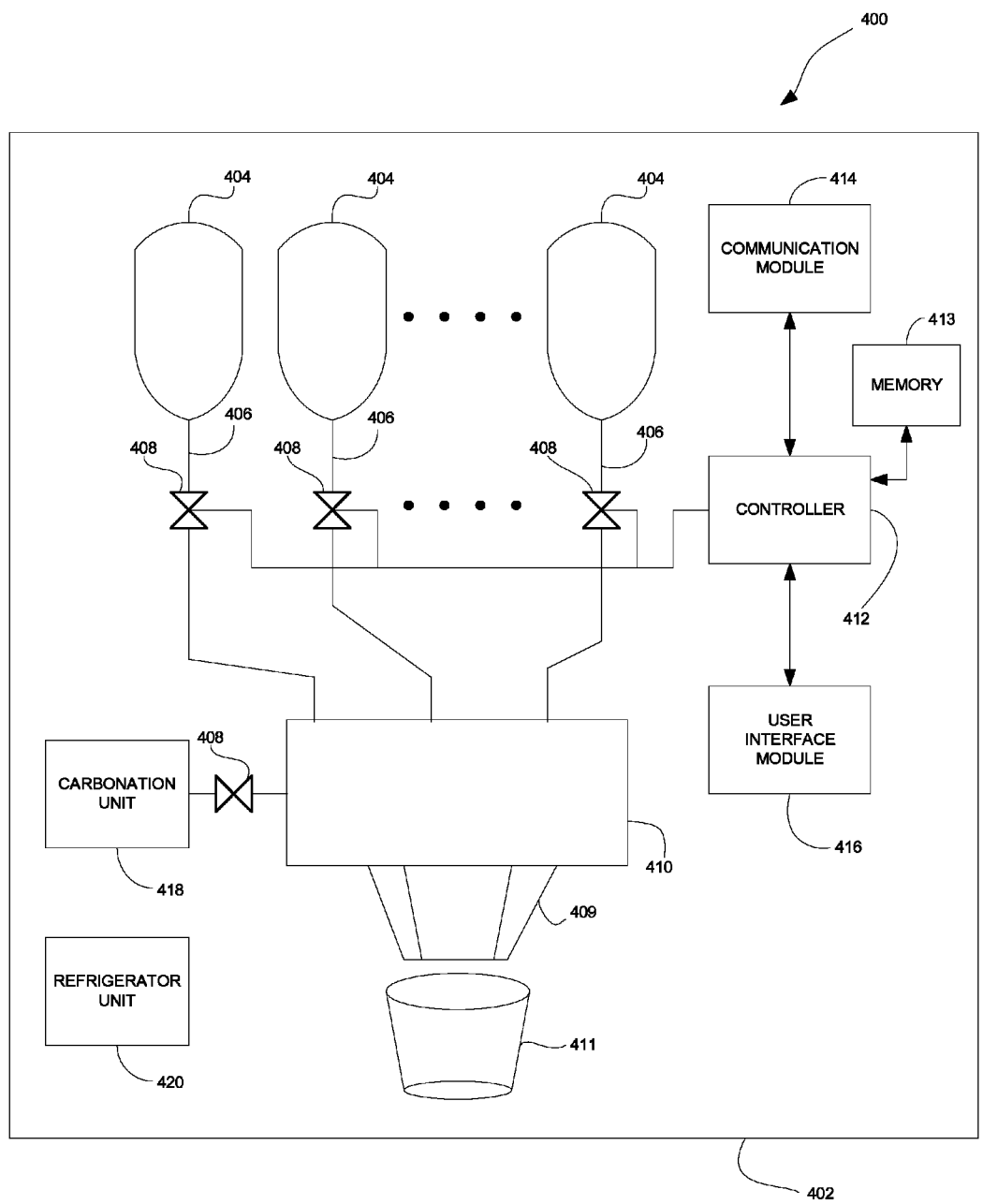
FIG. 4 is a diagram of a beverage dispenser in accordance with the present disclosure.
Figure 5:
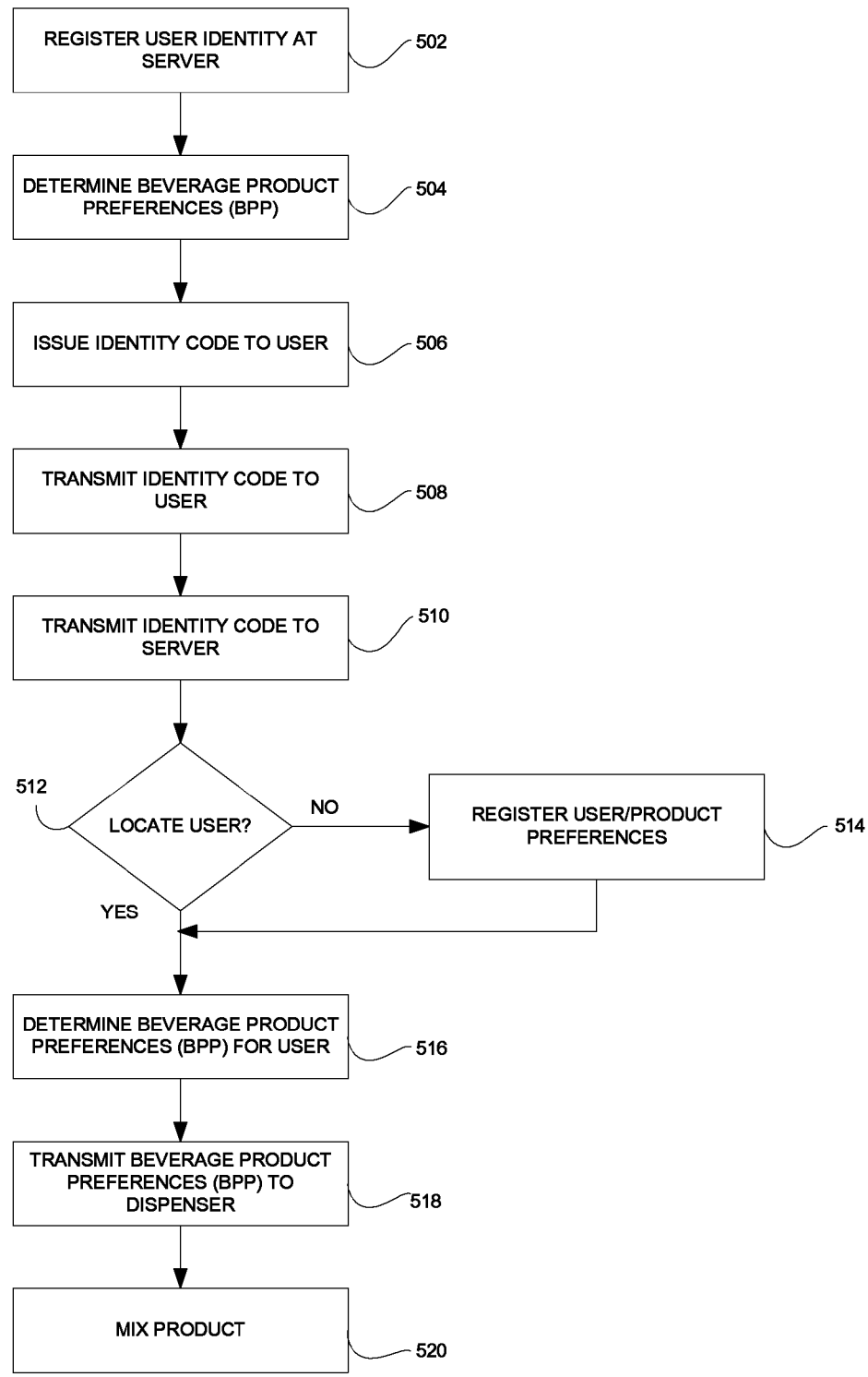
FIG. 5 is a flow chart illustrating a method for dispensing a beverage according to a user's preferences.

The above described embodiment will now be described in relation to FIGS. 1, 4 and 5 where FIG. 4 is a beverage dispenser in accordance with an embodiment of the present disclosure and FIG. 5 is a flow chart illustrating a method for dispensing a beverage according to a user's preferences.

A beverage dispenser 400 to mix and dispense beverages in accordance with the present disclosure is shown in FIG. 4. The dispenser 400 will consist of a housing 402 and a plurality of compartments 404 for storing elements of the beverages, for instance, soda syrup, additional flavorings such as lemon or lime, additional sweeteners for the beverage, etc. The compartments 404 are coupled to a dispensing section 409 by tubing 406 including valves 408. The valves 408 may be any valves known in the art including but not limited to electrically actuated valves, pneumatically actuated valves, etc. The dispensing section 409 will mix the various elements and direct the mixture into a receptacle 411, e.g., a cup, bottle, can, etc. Alternatively, the tubing 406 will led to a mixing chamber 410 to mix the various elements before allowing the mixture to flow to the dispensing section 409. The dispenser 400 will further include a water carbonation unit 418 to carbonate the beverage and refrigeration system 420 to cool the beverage and/or elements contained within the housing 402 of the dispenser 400. Optionally, the mixing chamber 410 may include a valve controlling the flow of the beverage to the dispensing section 409. All of the valves 408 will be coupled to a controller 412, e.g., a microprocessor, which will actuate each valve independently to control the amount of each element or ingredient to be added to the mixture. Storage memory 413 in the form of random access memory, read only memory, etc., will be coupled to the controller 412 for storing instruction to be executed by the controller.

The dispenser 400 will further include a communication module (CM) 414 for coupling the dispenser to the global computer network, e.g., the Internet, and for enabling communications between the dispenser 400 and a server residing on the Internet. The dispenser 400 will also include a user interface module (UIM) 416 for enabling a user to input information to the dispenser and to receive information from the dispenser. The user interface module 416 will enable communications between the user and dispenser via a keyboard, voice recognition module, WiFi communication (b, d, g, n, etc.), RFID communications, infrared communication, Bluetooth, or any other type of communication now known or practiced in the future that will allow the user to identify themselves and/or input information to the beverage dispenser. The user interface module 416 will also include a display screen to relay messages from the controller and/or from a server residing on the Internet via the communication module 414 to the display. This display may be in the form of an LCD display, LED display, Plasma display, CRT display, or another type of display device currently known or utilized in the future. Optionally, the user interface module 416 will include a card reader, e.g., a magnetic swipe reader, RFID card reader, etc., for reading a card issued to the user, the card including the identity of the user, the user's product preferences, credits for purchases, etc.

Referring to FIG. 5, initially, in step 502, a user will go to a web site residing on a server 104 on the global computer network to register his identity at this site. At the web site, the server 104 will communicate with the user's computer 102 and transmit a questionnaire to the user for the user to fill out via a conventional browser interface, e.g., Microsoft™ Internet Explorer. This questionnaire will prompt information from the user where once completed, the server will use a software algorithm and with standard computer processing power to determine the users beverage product preferences (BPP) (step 504). Once the user's beverage product preferences (BPP) is determined, the server 104 will store this information in a standard database software program such as Microsoft™ SQL or Oracle™ Database, cross-referenced to the user's identify information. The server will then issue an identity code to the user (step 506), e.g., an alphanumeric code. The identity code may be embedded in an RFID card or on a magnetic swipe card. In one embodiment, the identity code may be transferred to the user's computer where the user may download the code to a mobile device, e.g., a personal digital assistant (PDA), mobile phone, etc., and the mobile device will wirelessly transfer the code to the user interface module 416 and/or the communication module 414 when the mobile device is within range of the dispenser 400.

Once the user is ready to dispense a beverage, the user will locate a beverage dispenser 400 that is coupled to the communications network 106. The user will then communicate the user's identity to the subject dispenser via the dispenser's user interface module 416 (step 508). Communications may be in the form of a keyboard, magnetic reader, voice recognition, WiFi™ communication (b, d, g, n, etc.), RFID communications, infrared communication, Bluetooth™, or any other type of communication now known or practiced in the future that will allow the user to identify themselves to the beverage dispenser. This system and method may also include the beverage manufacturer or beverage dispenser company issuing to the user an ID card that may have a magnetic stripe on the card or another form of communications for the user to use to communicate with the user interface module 416 of the beverage dispenser 400. As described above, the card may have credits for the user to purchase the beverage.

The beverage dispenser 400 will now use its communication module 414 to communicate with the server 104. Using the internal memory 413 of the dispenser 400, the communication module 414 will be directed to a specific web site on the global computer network and, while at that site, it will communicate the user's identity (step 510). The selected web site will identify the user's identity and, if known to the server (step 512), the server will use standard database lookup software such as Microsoft™ SQL or Oracle™ Database and standard computer processing power to locate the user's beverage product preferences (BPP) (step 516). These beverage product preferences (BPP) will be stored in the database 108 and cross-referenced by the user's identity, e.g., in the form of an Internet cookie from a previous registration session.

If the server 104 cannot locate the user's beverage product preferences (BPP) in the database 108 because the user is unknown to the database (step 512), the server 104 will communicate with the beverage dispenser's display and send a message that the user needs to register at a specific site (step 514). In one embodiment of the present disclosure, the user could be asked to complete a questionnaire while at the beverage dispenser via the user interface module 416. The questionnaire would be transmitted from the server 104 to the communication module 414 and controller 412 of the dispenser 400 and then would appear on the display of the dispenser. The user would fill out the questionnaire using the user interface module 416, and then the results of the questionnaire would be transmitted from the dispenser using the communication module 414 to the selected site on the Internet, where the user's beverage product preferences (BPP) would be determined by a computer software program utilizing standard computer processing power. As described above, the user's beverage product preferences (BPP) would be stored in database 108, cross-referenced to the user's identity. Furthermore, the user may be issued an identity code for future use at this or other beverage dispensers. Alternatively, the dispenser may accept the user's beverage product preferences (BPP) for a one time purchase at the dispenser and not store the beverage product preferences (BPP) in the database 108.

The server 104 will now transmit via the communications network 106 to the communication module 414 of the dispenser the user's beverage product preferences (BPP) (step 518). This beverage product preferences (BPP) information may appear on the display of the dispenser and the user could in one embodiment of this disclosure confirm the beverage product preferences (BPP) using the dispensers user interface module 416. Once the dispenser has the user's beverage product preferences (BPP), the controller 412 of the dispenser will tell the valves 408 that are part of the dispenser how much of each of the separate stored elements (e.g., flavors, carbonation, etc.) to release into the mixing chamber 410 or dispensing section 409 (step 520). For instance, one specific beverage product preferences (BPP) may cause the dispenser to mix a certain amount of lemon flavoring into a cola beverage. In another case, a user's beverage product preferences (BPP) could cause the dispenser to release additional sugar into the beverage. The dispenser may now dispense the customized beverage.

In a further embodiment, a plurality of dispensers will be coupled to the communications network and, periodically, server 104 will download the database of product preferences cross-referenced by user identities to each of the plurality of dispensers. In this embodiment, after a user identifies themselves to the dispenser via the user interface module 416 and/or the communication module 414, the controller 412 will retrieve the user's beverage product preferences (BPP) from memory without having to access the server 104.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A product to be consumed by a user comprising:
   a housing;
   at least one compartment containing an element of the product;

at least one valve coupling the at least one compartment to a mixing chamber for mixing a final product;

a controller configured to actuate the at least one valve and to control an amount of the element to enter the mixing chamber;

a communication module configured to transmit an identifier of the product to a server over a network, receive product preferences of the user from the server based on the identifier and communicate to the controller the specific valve settings for the at least one valve and the specific time and duration for actuating the mixing device based on the received product preferences of the user; and an exit port disposed on the housing for dispensing the final product.

2. The product as in claim 1, further comprising a mixing device disposed in the mixing chamber configured to mix the at least one element.

3. The product as in claim 1, wherein the at least one element is a fluid, a solid or any combination thereof.

4. The product as in claim 1, wherein the at least one valve is a MEMS microvalve.

5. The product as in claim 1, wherein the at least one valve and the controller are disposed on a single integrated circuit chip.

6. The product as in claim 1, wherein the communication module is configured to receive the product preferences of the user via voice recognition.

7. The product as in claim 1, wherein the communication module is configured to receive the product preferences of the user via hardwired or wireless communications from the server over the network.

8. The product as in claim 7, wherein the received product preferences is a formulation including a predetermined amount of at least one element.

9. The product as in claim 8, wherein the formulation is cross-referenced to a user identity code and stored in a database at the server.

10. The product as in claim 9, wherein the communication module is configured to transmit the user identity code with the identifier of the product to the server.

11. A beverage dispenser comprising:
at least one compartment containing an element of a beverage;
at least one valve coupling the at least one compartment to a dispensing section configured to dispense the beverage;
a mixing chamber for mixing the beverage;
a user interface module configured to receive and identity of a user and an identifier of the beverage;
a communication module configured to transmit the identity of the user and the identifier of the beverage to a server over a network, receive user generated beverage product preferences based on the identity of the user and the identifier of the beverage from the server and communication the user generated beverage product preferences to controller; and
the controller coupled to the communication module and configured to actuate the at least one valve to control an amount of the element to be dispensed and to actuate the mixing chamber based on the user genetated beverage product preferences.

12. The beverage dispenser of claim 11, wherein the user interface module is further configured to receive the product preferences of the user.

13. The beverage dispenser of claim 11, further comprising a database for storing product preferences of a plurality of users; wherein the user interface module is further configured to receive an identity of the user, wherein the product preference for at least one user is retrieved from the database based on the user's identity and transmitted to the controller.

14. The beverage dispenser of claim 13, wherein the user interface module further comprises a voice recognition module for receiving the identity of the user.

15. The beverage dispenser of claim 13, wherein the user interface module further comprises a wireless communication device for receiving the identity of the user.

16. The beverage dispenser of claim 13, wherein the user interface module further comprises a card reader for receiving the identity of the user.

17. The beverage dispenser of claim 13, wherein the user interface module further comprises a display for displaying the product preferences to the user, wherein the user interface module is further configured to receive confirmation of the product preference from the user.

18. The beverage dispenser of claim 11, wherein the user interface module further comprises a voice recognition module for receiving the identity of the user.

19. The beverage dispenser of claim 11, wherein the user interface module further comprises a wireless communication device for receiving the identity of the user.

20. The beverage dispenser of claim 11, wherein the user interface module further comprises a card reader for receiving the identity of the user.

21. The beverage dispenser of claim 11, wherein the user interface module further comprises a display for displaying the product preferences to the user, wherein the user interface module is further configured to receive confirmation of the product preference from the user.

22. The beverage dispenser of claim 21, wherein the user interface module is configured to receive product preferences from the user and the communication module is configured to transmit the product preferences to the server.

23. The beverage dispenser as in claim 11, wherein the product preference is a formulation including a predetermined amount of at least one element.

24. The beverage dispenser as in claim 23,
wherein the user interface is configured for prompting the user with at least one question relating to the beverage; and
the communication module is configured to transmit a response of the user to the at least one question to the server, wherein the server is configured for determining the formulation based on at least one response of the user and transmitting the formulation to the communication module.

25. The beverage dispenser as in claim 24, wherein the server is configured to issue an identity code for the user, cross-reference the identity code to the formulation and store the identity code and cross-referenced formulation in the database at the server.

26. The beverage dispenser as in claim 25, wherein the communication module is configured to transmit the identity code to the server.

* * * * *